United States Patent
Caverly et al.

(10) Patent No.: US 10,807,630 B2
(45) Date of Patent: Oct. 20, 2020

(54) STEERING COLUMN HAVING AN ENERGY ABSORPTION ASSEMBLY

(71) Applicant: STEERING SOLUTIONS IP HOLDING CORPORATION, Saginaw, MI (US)

(72) Inventors: Jacob A. Caverly, Freeland, MI (US); Scott A. Stinebring, Auburn, MI (US); Michael P. Anspaugh, Bay City, MI (US); Robert D. Maida, Pinconning, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 148 days.

(21) Appl. No.: 16/204,455

(22) Filed: Nov. 29, 2018

(65) Prior Publication Data

US 2020/0172147 A1    Jun. 4, 2020

(51) Int. Cl.
*B62D 1/19* (2006.01)
*B62D 1/181* (2006.01)

(52) U.S. Cl.
CPC ............. *B62D 1/192* (2013.01); *B62D 1/181* (2013.01)

(58) Field of Classification Search
CPC ................................ B62D 1/192; B62D 1/181
See application file for complete search history.

(56) References Cited

U.S. PATENT DOCUMENTS

| | | | |
|---|---|---|---|
| 6,810,574 B1 | 11/2004 | Luthi et al. | |
| 8,375,822 B2 | 2/2013 | Ridgway et al. | |
| 8,408,089 B2 * | 4/2013 | Oshita | B62D 1/195 280/775 |
| 8,978,510 B2 | 3/2015 | Buzzard et al. | |
| 9,108,673 B2 | 8/2015 | Streng | |
| 9,399,481 B2 | 7/2016 | Oehri et al. | |
| 9,428,215 B1 | 8/2016 | Nagatani et al. | |
| 9,545,943 B2 | 1/2017 | Sakuda et al. | |
| 9,586,610 B2 | 3/2017 | Figlioli et al. | |
| 9,616,914 B2 * | 4/2017 | Stinebring | B62D 1/181 |
| 9,623,898 B2 | 4/2017 | Sakuda et al. | |
| 9,663,136 B2 * | 5/2017 | Stinebring | B62D 1/195 |
| 9,669,862 B1 * | 6/2017 | Dubay | B62D 1/192 |
| 9,764,757 B2 | 9/2017 | Buzzard et al. | |
| 10,023,222 B2 * | 7/2018 | Tinnin | B62D 1/192 |
| 10,093,341 B2 * | 10/2018 | Johta | B62D 1/189 |
| 10,464,592 B2 * | 11/2019 | Messing | F16H 25/20 |
| 2007/0068310 A1 | 3/2007 | Arihara | |
| 2008/0141815 A1 | 6/2008 | Ridway et al. | |
| 2008/0191457 A1 | 8/2008 | Ridgway et al. | |

(Continued)

FOREIGN PATENT DOCUMENTS

DE    102012101375 A1    8/2013

*Primary Examiner* — Faye M Fleming
(74) *Attorney, Agent, or Firm* — Dickinson Wright PLLC

(57) ABSTRACT

A steering column assembly that includes an upper jacket, a drive bracket, and an energy absorption assembly. The drive bracket is coupled to the upper jacket. The energy absorption assembly includes a first member and a second member. The first member has a first member body extending between a first member first end and a first member second end. The second member has a second member body extending between a second member first end and a second member second end. A receiving area is defined between the first member body and the second member body.

19 Claims, 2 Drawing Sheets

(56) References Cited

U.S. PATENT DOCUMENTS

| | | |
|---|---|---|
| 2008/0236325 A1 | 10/2008 | Ridgway et al. |
| 2009/0267336 A1 | 10/2009 | Streng et al. |
| 2010/0300238 A1 | 12/2010 | Ridgway et al. |
| 2011/0185839 A1 | 8/2011 | Inoue |
| 2013/0205935 A1 | 8/2013 | Buzzard et al. |
| 2014/0260758 A1 | 9/2014 | Buzzard |
| 2014/0260762 A1 | 9/2014 | Streng |
| 2015/0375770 A1 | 12/2015 | Buzzard et al. |
| 2016/0046318 A1* | 2/2016 | Stinebring ............. B62D 1/195 74/493 |
| 2016/0144883 A1 | 5/2016 | Vermeersch et al. |
| 2019/0225255 A1* | 7/2019 | Ishimura ................ B62D 1/192 |

* cited by examiner

STEERING COLUMN HAVING AN ENERGY ABSORPTION ASSEMBLY

BACKGROUND

The present disclosure relates to an energy absorption assembly provided with a steering column assembly.

Telescopically adjustable steering columns generally include an actuator that is arranged to telescopically adjust a position of the steering column relative to an operator of the vehicle along a steering column axis. During a vehicle impact the steering column may collapse along the steering column axis to absorb energy, which may be beneficial from the vehicle safety standpoint.

SUMMARY

Disclosed is a steering column assembly having a central axis and including a lower jacket, an upper jacket, a drive bracket, and an energy absorption assembly. The upper jacket is at least partially received within the lower jacket. The drive bracket is coupled to the upper jacket. The drive bracket is connected to a telescope actuator assembly that is arranged to move the upper jacket relative to the lower jacket. The energy absorption assembly includes a first member and an energy absorption strap. The first member has a first member first end connected to an energy absorption strap, a first member second end connected to the drive bracket, and a first member body extending between the first member first end and the first member second end. The energy absorption strap is disposed between the first member and the upper jacket. The energy absorption strap has a first strap portion connected to the first member first end, a second strap portion connected to the drive bracket, and an intermediate portion extending between the first strap portion and the second strap portion.

Also disclosed is a steering column assembly that includes an upper jacket, a drive bracket, and an energy absorption assembly. The upper jacket at least partially receives a lower jacket. The drive bracket is coupled to the upper jacket. The energy absorption assembly includes a first member and a second member. The first member has a first member first end, a first member second end, and a first member body extending between the first member first end and the first member second end. The second member has a second member first end, a second member second end connected to the drive bracket, and a second member body extending between the second member first end and the second member second end. A receiving area is defined between the first member body and the second member body.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the invention.

Figure 1:
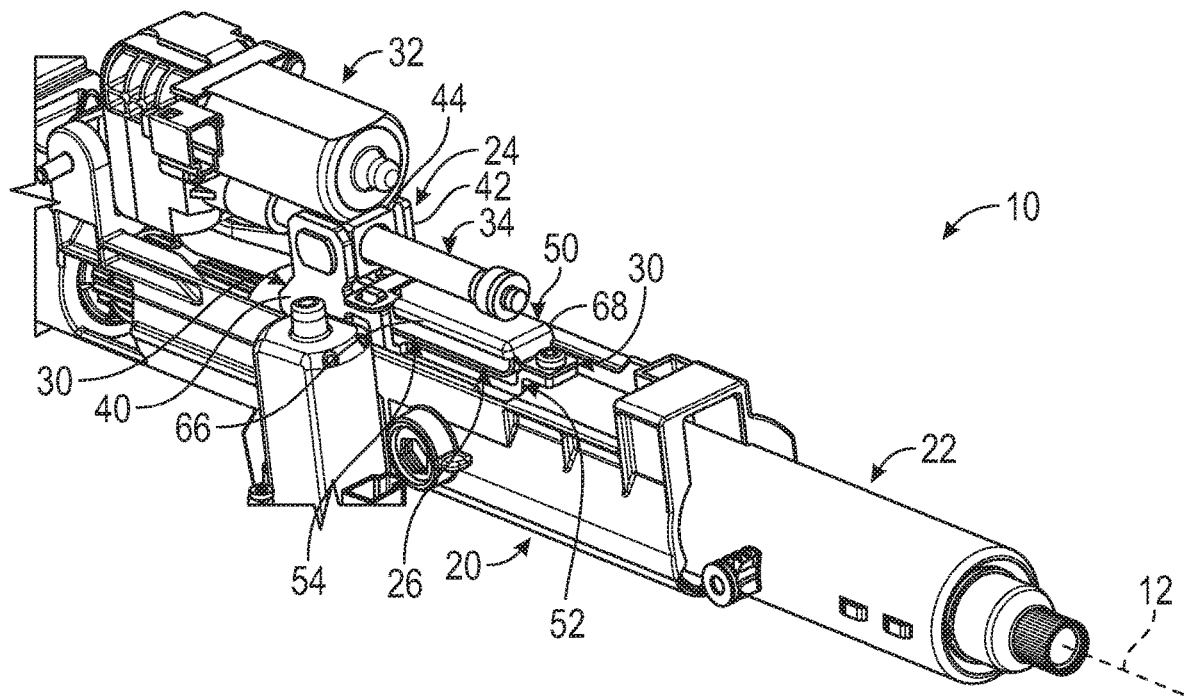
FIG. 1 is a perspective view of a steering column assembly.

Referring to FIG. 1, a steering column assembly 10 is shown in an extended position prior to a steering column collapse event. The steering column assembly 10 is adjustable along a central axis or a steering column axis 12. The steering column assembly 10 includes a lower jacket 20, an upper jacket 22, a telescope actuator assembly 24, and an energy absorption assembly 26.

The lower jacket 20 is disposed about the steering column axis 12. The lower jacket 20 defines an inner bore that slidably or telescopically receives at least a portion of the upper jacket 22. The lower jacket 20 is operatively connected to a vehicle structure through a mounting bracket, another intervening component, or directly to the vehicle structure.

The upper jacket 22 extends longitudinally along the steering column axis 12 and is at least partially received within the lower jacket 20. The upper jacket 22 is movable relative to the lower jacket 20 by operation of the telescope actuator assembly 24. The telescope actuator assembly 24 is arranged to translate the upper jacket 22 relative to the lower jacket 20 along the steering column axis 12.

The telescope actuator assembly 24 is disposed on at least one of the lower jacket 20 and the upper jacket 22. The telescope actuator assembly 24 includes a drive bracket 30, a telescope actuator 32, and a lead screw 34. The drive bracket 30 is coupled to the upper jacket 22 by any appropriate method, such as fastening, welding, or other joining method. The coupling between the drive bracket 30 and the upper jacket 22 is arranged to maintain the connection between the drive bracket 30 and the upper jacket 22 during telescope movement of the upper jacket 22 relative to the lower jacket 20 and the coupling is arranged to release the connection between the drive bracket 30 and the upper jacket 22 during a steering column collapse event. The drive bracket 30 is connected to the telescope actuator 32.

Figure 2:
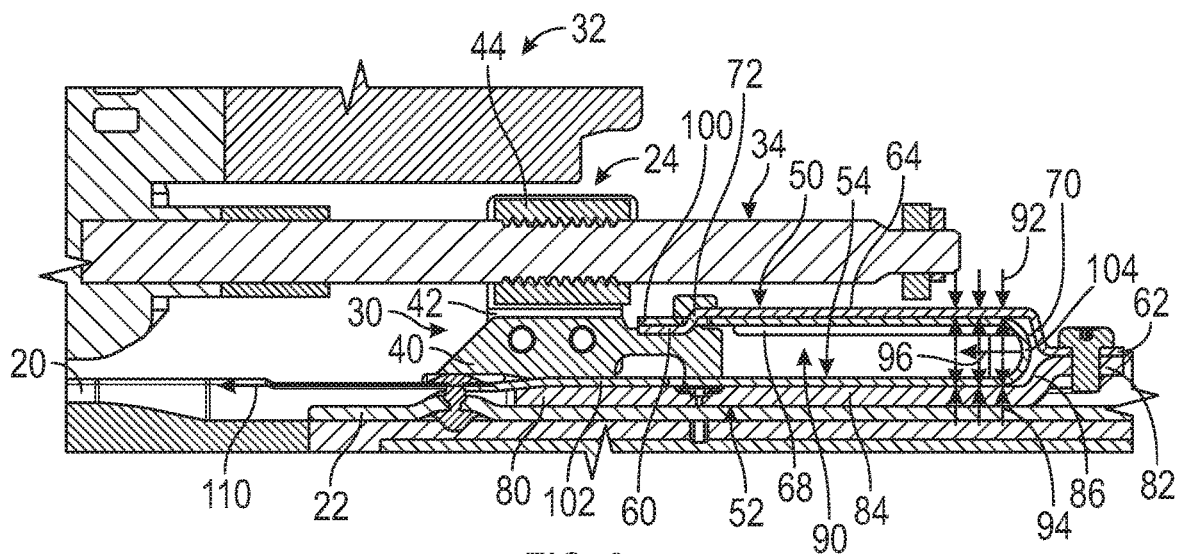
FIG. 2 is a partial section view the steering column assembly having an energy absorption assembly.
Figure 3:
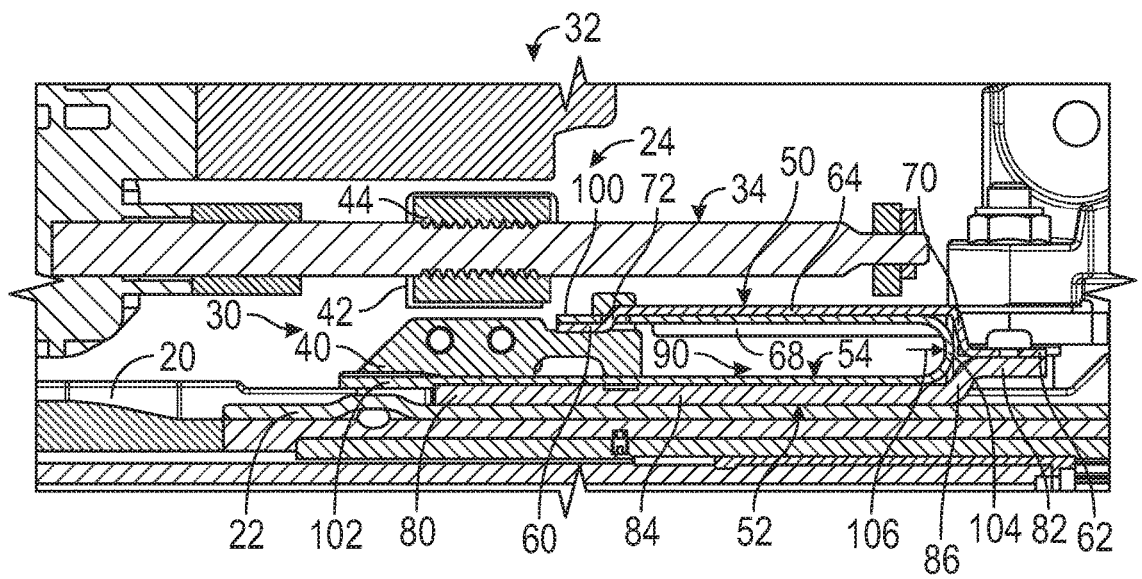
FIG. 3 is a partial section view the steering column assembly having an energy absorption assembly.
Figure 4:
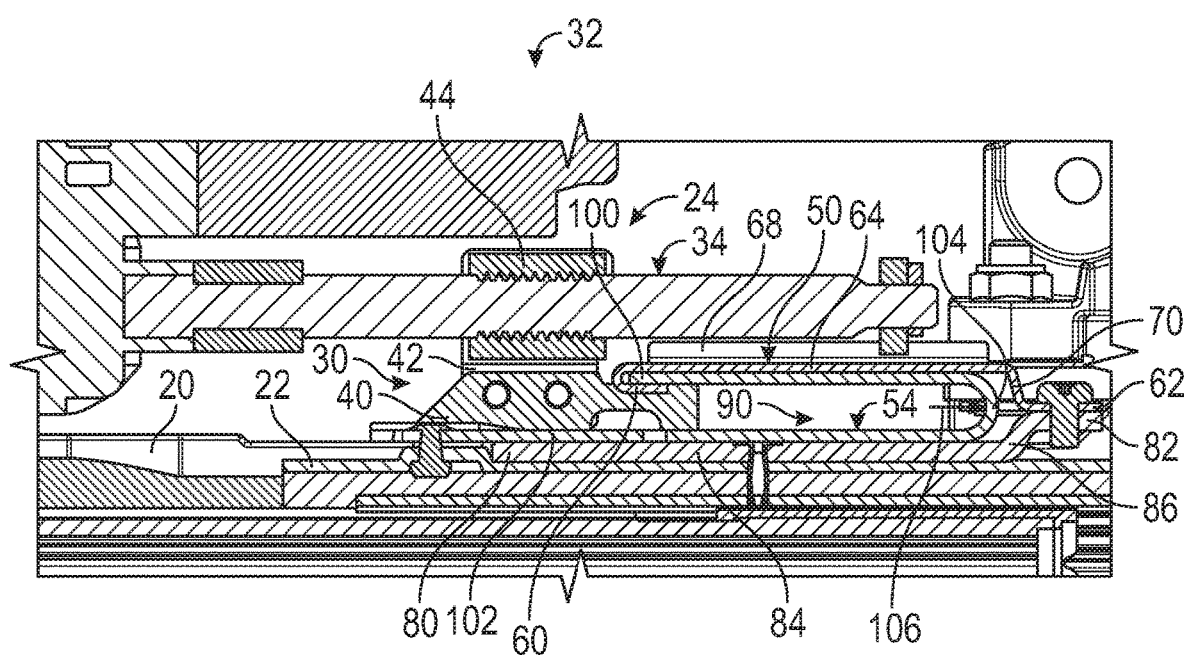
FIG. 4 is a partial section view the steering column assembly having an energy absorption assembly.

Referring to FIGS. 2-4, the drive bracket 30 includes a base portion 40 and a body portion 42 extending from the base portion 40. The body portion 42 defines an opening or an aperture that receives a jackscrew nut 44 through which at least a portion of the lead screw 34 extends.

The telescope actuator 32 is spaced apart from the drive bracket 30. The telescope actuator 32 is connected to the lower jacket 20. The telescope actuator 32 may be an electronic actuator, hydraulic actuator, pneumatic actuator, or the like.

The telescope actuator 32 is operatively connected to the drive bracket 30 via the lead screw 34. The lead screw 34 extends from the telescope actuator 32 and extends through the aperture of the body portion 42 of the drive bracket 30 and engages the jackscrew nut 44 to interconnect the drive bracket 30 and the telescope actuator 32. The telescope actuator 32 imparts rotary motion to the lead screw 34 and the drive bracket 30 converts the rotary motion into linear motion to translate the upper jacket 22 along the steering column axis 12 relative to the lower jacket 20.

Referring to FIGS. 1-4, the energy absorption assembly 26 extends between the lower jacket 20 and the upper jacket 22. The energy absorption assembly 26 translates with upper jacket 22 during operation of the telescope actuator assembly 24 to adjust the position of the upper jacket 22 relative to the lower jacket 20. The energy absorption assembly 26 is configured to provide a drag load or force opposing stroking or translation of the upper jacket 22 relative to the lower jacket 20 to decelerate the steering column assembly 10 during a steering column collapse event in which the upper jacket 22 is forcibly moved from an extended position towards a collapsed position at least partially within the lower jacket 20. The energy absorption assembly 26 includes a constraint bracket or a first member 50, a second member 52, and an energy absorption strap 54 that is disposed between the first member 50 and the second member 52.

Referring to FIGS. 2-4, the first member 50 is at least partially disposed between the telescope actuator assembly 24 and the upper jacket 22. The first member 50 is arranged as a guidance bracket or constraint bracket for the energy absorption strap 54 that facilitates the guidance of the energy absorption strap 54 during a steering column collapse event. The first member 50 includes a first member first end 60 that is connected to the energy absorption strap 54 that may in turn be connected to the drive bracket 30, a first member second end 62 that is connected to the drive bracket 30, and a first member body 64 extending between the first member first end 60 and the first member second end 62.

The first member first end 60 is arranged to be connected to a portion of the energy absorption strap 54. The first member first end 60 may be arranged to extend through a portion of the energy absorption strap 54, as shown in FIGS. 2 and 3, or may be otherwise connected to the first member first end 60 such as with a fastener, pin, etc. The first member first end 60 may be arranged to be at least partially disposed about a portion of the energy absorption strap 54, as shown in FIG. 4. In such an arrangement, the first member first end 60 clips over a portion of the energy absorption strap 54 to keep the first member 50 in a preferred orientation. The first member second end 62 may be connected to the telescope drive bracket 30 as the telescope drive bracket 30 remains stationary relative to the lower jacket 20 during an energy absorption event. The connection of the first member first end 60 with the energy absorption strap 54 and the connection of the first member second end 62 with the upper jacket 22 holds the first member 50 in a stationary position during an energy absorption event (i.e. steering column collapse event) to provide guidance to the energy absorption strap 54 during the event.

Referring to FIG. 1, the first member 50 includes a first side member 66 and a second side member 68. The first side member 66 and the second side member 68 each extend from opposing sides of the first member 50. The first side member 66 and the second side member 68 each extend between the first member first end 60 and the first member second end 62. The first side member 66 and the second side member 68 are disposed proximate opposing sides of the energy absorption strap 54. The first side member 66 and the second side member 68 may increase the stiffness of the first member 50.

Referring to FIGS. 2-4, the first member 50 includes a first engagement surface 70 that extends between the first member second end 62 and the first member body 64. The first engagement surface 70 is disposed in a non-parallel and non-perpendicular relationship with respect to the first member second end 62 and the first member body 64. A stepped surface or angled surface 72 may be provided with the first member 50, as shown in FIGS. 2 and 3. The stepped surface or angled surface 72 extends between the first member first end 60 and the first member body 64. The stepped surface or angled surface 72 is disposed in a non-parallel and non-perpendicular relationship with respect to the first member first end 60 and the first member body 64.

Referring to FIGS. 1-4, the second member 52 is disposed on the upper jacket 22. The second member 52 may be provided as part of the drive bracket 30 or may be a separately provided component that is disposed on the upper jacket 22. The second member 52 is at least partially disposed between the telescope actuator assembly 24 and the upper jacket 22. The second member 52 includes a second member first end 80 that is connected to the energy absorption strap 54, a second member second end 82 that is connected to the telescope drive bracket 30 and/or to the first member second end 62, and a second member body 84 extending between the second member first end 80 and the second member second end 82.

Referring to FIGS. 2-4, the second member 52 includes a second engagement surface 86 that extends between the second member second end 82 and the second member body 84. The second engagement surface 86 is disposed in a non-parallel and non-perpendicular relationship with respect to the second member second end 82 and the second member body 84.

The first member 50 cooperates with the second member 52 to define a receiving area 90 between the first member 50 and the second member 52. The energy absorption strap 54 is disposed within the receiving area 90 and the first member 50 constrains or applies a first compressive force 92 to the energy absorption strap 54 to resist bulging or deformation of the energy absorption strap 54 during a steering column collapse event, as shown in FIG. 2. The second member 52 applies a second compressive force 94 to the energy absorption strap 54 to resist bulging or deformation of the energy absorption strap 54 during a steering column collapse event, as shown in FIG. 2.

The first member 50 may be provided independent of the second member 52 or the first member 50 may be provided along with the second member 52. The first engagement surface 70 of the first member 50 and/or the second engagement surface 86 of the second member 52 may apply a force 96 to a portion of the energy absorption strap 54, as shown in FIG. 2. The force 96 constrains or resists deformation of the energy absorption strap 54 during a steering column collapse event.

The energy absorption strap 54 is disposed between the first member 50 and the upper jacket 22. The energy absorption strap 54 includes a first strap portion 100, a second strap portion 102, and an intermediate portion 104 that extends between the first strap portion 100 and the second strap portion 102. The first strap portion 100 is connected to the base portion 40 of the drive bracket 30. The first member first end 60 extends at least partially through the first strap portion 100, as shown in FIGS. 2 and 3. The first member first end 60 may be at least partially disposed about the first strap portion 100, as shown in FIG. 4. The second strap portion 102 is disposed on and may be connected to the upper jacket 22. The intermediate portion 104 defines a radius 106. The radius 106 of the intermediate portion 104 is arranged such that the first strap portion 100 is disposed parallel to the second strap portion 102.

During a steering column collapse event, the second strap portion 102 is pulled in the direction 110 by the collapsing of the upper jacket 22 within the lower jacket 20, as shown in FIG. 2. The first engagement surface 70 of the first member 50 and/or the second engagement surface 86 of the second member 52 apply force 96 to the intermediate portion 104 to inhibit a change in the radius 106 of the intermediate portion 104 of the energy absorption strap 54. The inhibition of the change in the radius 106 enables the energy absorption strap 54 to provide a consistent drag force during the steering column collapse event. The first member 50 and the second member 52 apply their respective compressive forces 92, 94 to inhibit the first strap portion 100 and the second strap portion 102 from moving away from each other or bulging relative to each other, such that the energy absorption strap 54 remains within the receiving area 90.

The relationship between the first member body 64 relative to the first member first end 60 and the first member second end 62 may be varied such that the first member body 64 may be disposed in a non-parallel relationship (e.g. tapers towards either the first member first end 60 or the first member second end 62) with respect to at least one of the first member first end 60 and the first member second end 62. The varying of the relationship between the first member body 64 relative to the first member first end 60 and the first member second end 62 may adjust the amount of guidance provided to the energy absorption strap 54 during a steering collapse event such that the radius 106 of the intermediate portion 104 may increase or decrease. The varying of the radius 106 enables the energy absorption strap 54 to provide a variable drag force during the steering column collapse event.

The first member 50 and/or the second member 52 provide guidance to the energy absorption strap 54 while not restricting energy absorption strap 54 positioning. The first member 50 and the second member 52 provides a self-engaging assembly that minimizes components for installation and retention of the energy absorption strap 54 while also providing a compact footprint.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly having a central axis, the steering column assembly, comprising:
    a lower jacket;
    an upper jacket at least partially received within the lower jacket;
    a drive bracket coupled to the upper jacket, the drive bracket is connected to a telescope actuator assembly that is arranged to move the upper jacket relative to the lower jacket; and
    an energy absorption assembly, comprising:
        a first member having a first member first end connected to an energy absorption strap, a first member second end connected to the drive bracket, and a first member body extending between the first member first end and the first member second end, and
        an energy absorption strap disposed between the first member and the upper jacket, the energy absorption strap having a first strap portion connected to the first member first end, a second strap portion connected to the drive bracket, and an intermediate portion extending between the first strap portion and the second strap portion.

2. The steering column assembly of claim 1, the first member being at least partially disposed between the telescope actuator assembly and the upper jacket.

3. The steering column assembly of claim 1, the first member being arranged to apply a compressive force to the first strap portion.

4. The steering column assembly of claim 1, the first member having a first side member extending from the first member body and a second side member disposed opposite the first side member, the first side member and the second side member each extending between the first member first end and the first member second end.

5. The steering column assembly of claim 4, the first side member and the second side member are disposed proximate opposing sides of the first strap portion.

6. The steering column assembly of claim 1, during a steering column collapse event the first member is arranged to inhibit the first strap portion from moving towards the telescope actuator assembly.

7. A steering column assembly, comprising:
    an upper jacket at least partially received within a lower jacket;
    a drive bracket coupled to the upper jacket; and
    an energy absorption assembly, comprising:
        a first member having a first member first end, a first member second end, and a first member body extending between the first member first end and the first member second end, and
        a second member having a second member first end, a second member second end connected to the drive bracket, and a second member body extending between the second member first end and the second member second end, a receiving area being defined between the first member body and the second member body.

8. The steering column assembly of claim 7, the energy absorption assembly further comprising:
    an energy absorption strap disposed within the receiving area.

9. The steering column assembly of claim 8, the energy absorption strap having a first strap portion connected to the first member first end, a second strap portion connected to the drive bracket, and an intermediate portion extending between the first strap portion and the second strap portion.

10. The steering column assembly of claim 9, the first member first end extends through the first strap portion.

11. The steering column assembly of claim 9, the first member first end is at least partially disposed about a portion of the first strap portion.

12. The steering column assembly of claim 9, the first member having a first engagement surface that extends between the first member second end and the first member body.

13. The steering column assembly of claim 12, the first engagement surface is disposed in a non-parallel and non-perpendicular relationship with respect to the first member second end.

14. The steering column assembly of claim 12, the second member having a second engagement surface that extends between the second member second end and the second member body.

15. The steering column assembly of claim 14, the second engagement surface is disposed in a non-parallel and non-perpendicular relationship with respect to the second member second end.

16. The steering column assembly of claim 14, the first engagement surface and the second engagement surface engage the intermediate portion.

17. The steering column assembly of claim 16, the intermediate portion defines a radius such that the first strap portion is disposed parallel to the second strap portion.

18. The steering column assembly of claim 17, during a steering column collapse event the first engagement surface and the second engagement surface are arranged to inhibit a change in the radius.

19. The steering column assembly of claim 17, during a steering column collapse event the first member and the second member are arranged to inhibit the first strap portion and the second strap portion from moving away from each other.

* * * * *